UNITED STATES PATENT OFFICE.

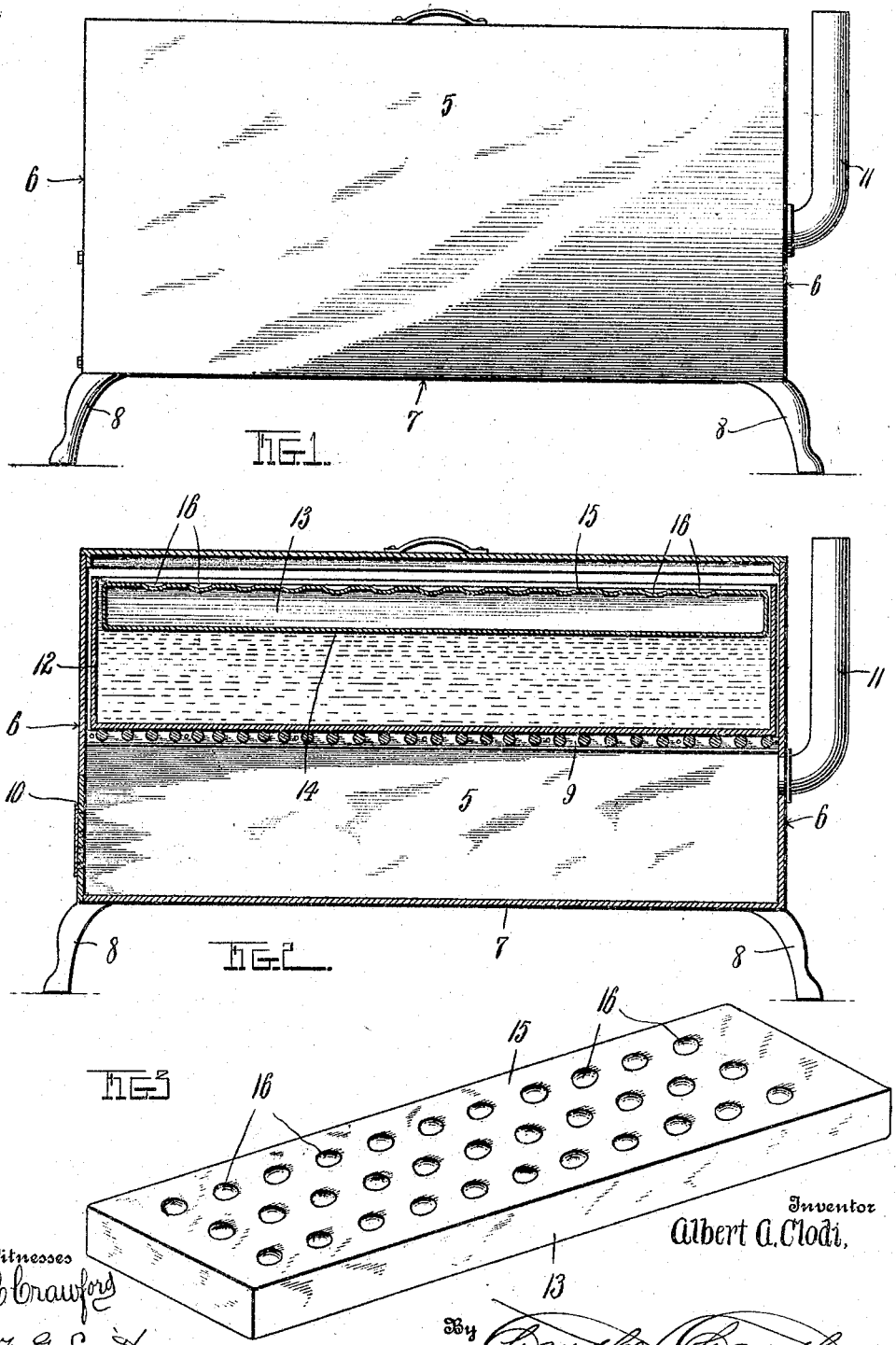

ALBERT A. CLODI, OF UNION HILL, ILLINOIS.

INCUBATOR.

No. 901,153.  Specification of Letters Patent.  Patented Oct. 13, 1908.

Application filed June 4, 1908. Serial No. 436,660.

*To all whom it may concern:*

Be it known that I, ALBERT A. CLODI, a citizen of the United States, residing at Union Hill, in the county of Kankakee, State of Illinois, have invented certain new and useful Improvements in Incubators; and I do hereby declare the following to be a full, clear, and exact description of the invention, such as will enable others skilled in the art to which it appertains to make and use the same.

This invention relates to incubators and has as its primary object to provide a device of this character in which the eggs will be kept at a constant temperature and will not be subjected to such fluctuation in temperature as occurs in the ordinary heated air incubators.

In carrying out my invention, I provide a heater and support within this heater a tank or hot-water receptacle and float upon the surface of the water within the receptacle an egg tray upon which the eggs to be hatched are disposed the tray being immersed in the water to a sufficient degree to insure an even temperature.

In the accompanying drawings, Figure 1 is a side elevation of the incubator embodied in my invention, Fig. 2 is a vertical longitudinal sectional view therethrough, Fig. 3 is a detail perspective view of the egg supporting float of the device.

As shown in the drawings, the incubator embodying my invention comprises a heater which is comprised of side walls 5, end walls 6, and a bottom 7. The said heater is supported upon suitable legs 8 located one at each corner thereof and disposed within the heater above the bottom 7 thereof is a grate 9 there being a door 10 at one end 6 of the heater to admit of access being had to the space between the said grate and the said bottom of the heater it being understood that the fuel to be burned in the heater is placed upon the said bottom and beneath the grate 9 there being a flue or smoke-stack 11 leading from the other end of the said heater.

Removably disposed within the heater and upon the grate 9 thereof is a tank or hot-water container 12 which is of rectangular construction and in which water is to be poured prior to the insertion of the eggs in the incubator. The egg support of the incubator is in the form of a float which is of hollow rectangular construction and comprises sides 13 a bottom 14 and a top 15 which latter is formed with a number of egg receiving depressions 16. The said support is disposed loosely within the hot-water container 12 and is nearly of the same dimensions it being floated upon the surface of water within the said container and being adapted to rise and fall with the water level within the said container. Owing to the fact that the egg support does rise and fall with the water level, it will be understood that the quantity of water within the container within certain limits, in no way affects the temperature, the degree being a constant one.

What is claimed is:

1. An incubator comprising a hot-water container and an egg supporting member disposed within the container and constructed and arranged to rise and fall with the level of the water within the container the said member being floated upon the surface of the water.

2. An incubator comprising a heater, a hot-water container arranged within the heater, and an egg supporting float received in the container.

In testimony whereof, I affix my signature, in presence of two witnesses.

ALBERT A. CLODI.

Witnesses:
 GEO. VAN VOORST,
 WILLIAM DITTUS.